May 11, 1948.  E. F. SARVER  2,441,253
VALVE
Filed Oct. 30, 1944
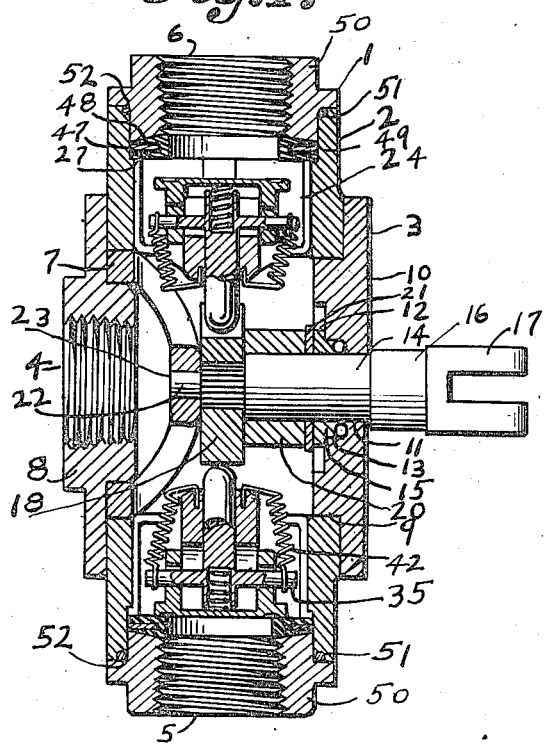
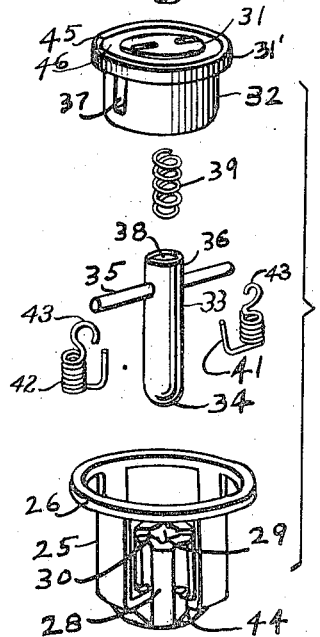
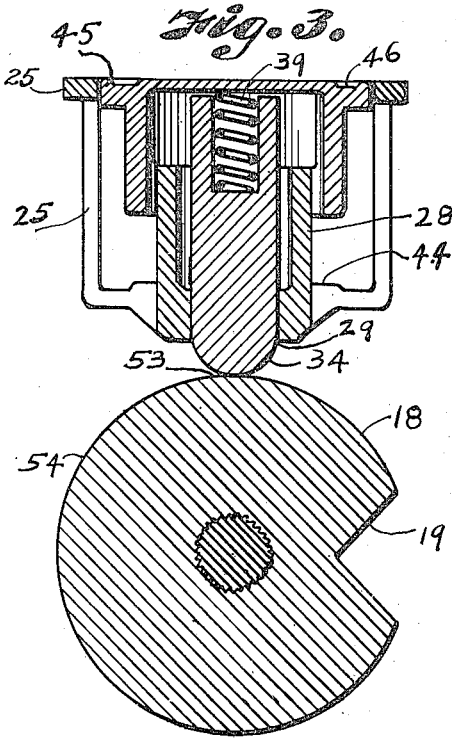
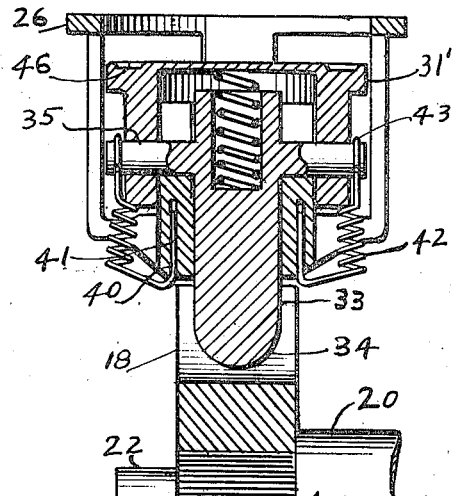
Inventor
Emmett F. Sarver
By Fishburn & Mullendore,
Attorneys Patented May 11, 1948

2,441,253

UNITED STATES PATENT OFFICE 2,441,253

VALVE

Emmett F. Sarver, Erie, Pa., assignor to Rohm Manufacturing Company, Inc., Erie, Pa., a corporation of Kansas Application October 30, 1944, Serial No. 561,040

7 Claims. (Cl. 251—132)

This invention relates to valves, and more particularly to valves having a plurality of outlet ports requiring a plurality of carriage and poppet assemblies in said ports for the flow of fluids. Heretofore in valves of this type, and particularly in valves requiring a cartridge assembly, it has required a great many moving parts which caused excess friction and wearing out of such parts.

It is an object of the present invention, therefore, to make a simple, economical and efficient valve structure having few working parts; to provide for positively opening and closing the valve; to provide a carriage and poppet assembly for said valve having a reverse action to positively open and close said valve; to provide a cam for actuating the cartridge assembly which also acts as an index for said valve for indicating when the valve is open or closed, and to provide means for positively retaining the valve in open or closed position.

In accomplishing these and other objects of the invention, I have provided improved details of structure, the preferred form of which is illustrated in the accompanying drawings wherein:

Fig. 1 is a vertical cross-sectional view of the valve illustrating my invention.

Fig. 2 is a perspective view of the carriage and poppet assembly showing the parts in disassembled relation.

Fig. 3 is a cross-sectional elevational view of the carriage and poppet assembly showing the actuating pin in relation to the cam on the actuating shaft with the valve closed.

Fig. 4 is a cross-sectional elevational view of the carriage and poppet assembly showing the actuating cam and showing the valve open.

Referring more in detail to the drawings:

1 designates a valve embodying my invention comprising a body 2 having a chamber 3, an inlet port 4 and outlet ports 5 and 6. While I have here shown two outlet ports it will be seen that less or additional ports may be provided if desired. Adapted to seat in the cylindrical inlet port 4 is a spider 7 held in place by an internally screwthreaded flange fitting 8.

The side of the housing 2 opposite the inlet port is provided with an opening 9 adapted to receive a flange fitting 10 provided with an opening 11 and internally offset shoulders 12 and 13. A shaft 14 is provided for engagement in the flange opening 11 adapted to be held in place by a cylindrical bushing 15 engaging the shoulders 12 and 13 of said flange fitting. The outer end of the shaft is offset and adapted to receive a collar 16 having a yoke 17 for turning said shaft. The yoke collar may be fastened to said shaft in the ordinary manner, preferably by a pin (not shown).

A cam 18 is rigidly attached to the inner end of the shaft 14 having a chord or detent 19 for a purpose later described. The cam may be made from plastic or other suitable material.

A bushing 20 and washer 21 are preferably inserted over the shaft 14 between the cam 18 and the bushing 13 to aid in holding the cam in place on the shaft and lend rigidity to the structure. The shaft 14 extends outwardly from the cam 18 as indicated at 22 and is adapted to fit in a bearing opening 23 in the spider 7.

Located within the respective outlet ports are poppet assemblies 24 adapted for opening and closing said ports. Each assembly comprises a cage 25 having a flange 26 around the outer periphery of the open part of said cage adapted to seat on an annular shoulder 27 in said outlet ports. The cage 25 has an upstanding cylindrical hub 28 having an opening 29 through its longitudinal center. The hub is also provided with a slot or groove 30 extending a substantial distance in said hub.

A poppet 31 is provided in the cage 25 having a cylindrical body member 32 having a peripheral flange 31' adapted to seat around the hub 28 of said cage. A pin 33 having a rounded end 34 is provided for loose fitting in the opening 29 in the hub of the cage 25. The pin 33 is provided near its outer end with a bearing pin 35 extending transversely of the pin 33. The outer end 36 and the pin 35 extend upwardly in the poppet 31 and the poppet is provided with elongated openings 37 on the opposite side of the body member 32 adapted to act as a bearing portion for the pin 35. The end of the pin 33 is provided with an opening 38 adapted to receive a coil spring 39 to provide tension between the poppet 31 and the pin 33 and to provide for any discrepancy in the distance from the center of the cam to the valve seat.

The lower end of the cage 25 is provided with openings 40 adapted to receive the ends 41 of springs 42. The opposite ends of the springs 42 are provided with loops 43 adapted to hook over the ends of the cross pin 35 in the pin 33 which cross pins extend outwardly a slight distance from the openings 37 in the poppet member 31. When the poppet is assembled in the cage the bearing openings 37 register with the slots 30 in the hub 28 of said cage so that when the springs 42 are applied to the cage and cross pins 35, the tension of the spring will draw the poppet down to rest on the shoulders 44 extending around the upstanding hub 28 in said cage. The poppet 31 is provided with an upstanding peripheral flange 45 around its outer periphery providing an annular groove 46 in the top of said poppet member.

I also preferably provide a flat cylindrical ring 47 preferably made of steel or other suitable material adapted to fit in the port and rest on the circumferential flange 26 of the cage 25. I also provide a ring 48, preferably made of rubber or other resilient material, having an annular groove 49 around the outer circumference thereof adapted to receive the flat ring 47 which extends inwardly from the flange 26 of the cage providing a seat for the poppet 31.

Internally screw-threaded flange fittings 50 are provided for the port openings 5 and 6 having their inner end resting on the rubber ring 48. I also preferably provided a gasket ring 51 preferably made of rubber or other resilient material adapted to rest on the rounded shoulders 52 of the body member for sealing the fittings in said ports.

When the parts of my device, above described, are assembled, the rounded end 34 of the pin 33 of the poppet assembly engages the rim of the cam 18 as indicated at 53, Fig. 3, and the valve is then in closed position. When the rounded end 34 of the pin 33 is engaged in the detent 19 of the cam 18 the valve will be open as shown in Fig. 4.

Operation of a valve constructed and assembled as described is as follows:

When it is desired to close the valve, shaft 14 may be turned through manipulation of the yoke 17 so that the end 34 of the pin 33 of the poppet assemblies contacts the outer periphery 54 of the cam 18. When it is desired to open the valve, the shaft is turned so that the end 34 of the pin 33 engages in the detent 19 of the cam and the springs 42 will exert pressure on the cross pin 35 which in turn exerts downward pressure on the poppet 31 thus opening the valve. It will thus be seen that only one outlet port may be open at one time for the reason that only one pin may enter the detent. Further turning of the shaft 14 will close the valve as above described by raising the pin out of the detent 19. When the valve is closed the flange 45 of the poppet 31 contacts the rubber ring 48 so that no fluid can pass therethrough. It is believed apparent, therefore, that the present invention provides a simple, compact and efficient valve adapted for use as described.

What I claim and desire to secure by Letters Patent is:

1. A poppet assembly adapted for use in a valve outlet port including a carriage having an upstanding hub therein and provided with a cylindrical opening and a transverse slot, a poppet adapted to seat in said carriage, said poppet having a cylindrical body member provided with slots, a pin having a rounded end adapted to engage in said cylindrical opening in said hub and its opposite end having a cylindrical chamber therein, a bearing pin extending transversely of the first-named pin for engaging in the slots in said poppet body, springs attached to said bearing pin and having their opposite ends engaging in openings in the bottom of said cage, a coil spring engaging in said opening in said longitudinal pin and having its outer end engaging the top of said poppet member, the outer periphery of said poppet member having an upstanding flange for forming a cylindrical groove in the top thereof, means for sealing said poppet in said port opening, and means for opening and closing said poppet.

2. A poppet assembly adapted for use in a valve outlet port including a carriage having an upstanding hub therein and provided with a cylindrical opening and a transverse slot, a poppet adapted to seat in said carriage, said poppet having a cylindrical body member provided with slots, a pin having a rounded end adapted to engage in said cylindrical opening in said hub and its opposite end having a cylindrical chamber therein, a bearing pin extending transversely of the first-named pin for engaging in the slots in said poppet body, springs attached to said bearing pin and having their opposite ends engaging in openings in the bottom of said cage, a coil spring engaging in said opening in said longitudinal pin and having its outer end engaging the top of said poppet member, the outer periphery of said poppet member having an upstanding flange for forming a cylindrical groove in the top thereof, a ring for sealing said poppet in said port opening, and means for opening and closing said poppet.

3. A poppet assembly adapted for use in a valve outlet port including a carriage having an upstanding hub therein and provided with a cylindrical opening and a transverse slot, a poppet adapted to seat in said carriage, said poppet having a cylindrical body member provided with slots, a pin having a rounded end adapted to engage in said cylindrical opening in said hub and its opposite end having a cylindrical chamber in its opposite end, a bearing pin extending transversely of the first-named pin for engaging in the slots in said poppet body, springs attached to said bearing pin and having their opposite ends engaging in openings in the bottom of said cage, a coil spring engaging in said opening in said longitudinal pin and having its outer end engaging the top of said poppet member, the outer periphery of said poppet member having an upstanding flange for forming a cylindrical groove in the top thereof, means for sealing said poppet in said port opening, and means for engaging said first-named pin for opening and closing said poppet.

4. A poppet assembly adapted for use in a valve outlet port including a carriage having an upstanding hub therein and provided with a cylindrical opening and a transverse slot, a poppet adapted to seat in said carriage, said poppet having a cylindrical body member provided with slots, a pin having a rounded end adapted to engage in said cylindrical opening in said hub and its opposite end having a cylindrical chamber therein, a bearing pin extending transversely of the first-named pin for engaging in the slots in said poppet body, springs attached to said bearing pin and having their opposite ends engaging in openings in the bottom of said cage, a coil spring engaging in said opening in said longitudinal pin and having its outer end engaging the top of said poppet member, the outer periphery of said poppet member having an upstanding flange for forming a cylindrical groove in the top thereof, a flange fitting adapted to engage in said outlet port, means for sealing said poppet in said port opening, and means for opening and closing said poppet.

5. A poppet assembly adapted for use in a valve outlet port including a carriage having an upstanding hub therein and provided with a cylindrical opening and a transverse slot, a poppet adapted to seat in said carriage, said poppet having a cylindrical body member provided with slots, a pin having a rounded end adapted to engage in said cylindrical opening in said hub and its opposite end having a cylindrical chamber therein, a bearing pin extending transversely of the first-named pin for engaging in the slots in said poppet body, springs attached to said bearing pin and having their opposite ends engaging in openings in the bottom of said cage, a coil spring engaging in said opening in said longitudinal pin and having its outer end engaging the top of said poppet member, the outer periphery of said poppet member having an upstanding flange for forming a cylindrical groove in the top thereof, a gasket ring for sealing said poppet in said port openings, and means engaging said first-named pin for opening and closing said poppet.

6. A poppet assembly adapted for use in a valve outlet port including a carriage having an upstanding hub therein and provided with a cylindrical opening and a transverse slot, a poppet adapted to seat in said carriage, said poppet having a cylindrical body member provided with slots, a pin having a rounded end adapted to engage in said cylindrical opening in said hub and its opposite end having a cylindrical chamber therein, a bearing pin extending transversely of the first-named pin for engaging in the slots in said poppet body, springs attached to said bearing pin and having their opposite ends engaging in openings in the bottom of said cage, means engaging said longitudinal pin and the top of said poppet member for exerting tension thereon, the outer periphery of said poppet member having an upstanding flange for forming a cylindrical groove in the top thereof, means including a flexible rubber ring adapted to engage the inner end of said fitting and said poppet, and means engaging said first-named pin for opening and closing said poppet.

7. A poppet assembly adapted for use in a valve outlet port including a carriage having an upstanding hub therein and provided with a cylindrical opening and a transverse slot, a poppet adapted to seat in said carriage, said poppet having a cylindrical body member provided with slots, a pin having a rounded end adapted to engage in said cylindrical opening in said hub and its opposite end having a cylindrical chamber therein, a bearing pin extending transversely of the first-named pin for engaging in the slots in said poppet body, springs attached to said bearing pin and having their opposite ends engaging in openings in the bottom of said cage, a coil spring engaging in said opening in said longitudinal pin and having its outer end engaging the top of said poppet member, the outer periphery of said poppet member having an upstanding flange for forming a cylindrical groove in the top thereof, a flange fitting adapted to engage in said outlet port, means including a flexible rubber ring adapted to engage the inner end of said fitting and said poppet, and means engaging said first-named pin for opening and closing said poppet.

EMMETT F. SARVER.

REFERENCES CITED

The following references are of record in the file of this patent:

UNITED STATES PATENTS

| Number | Name | Date |
|---|---|---|
| 1,925,610 | Shinn | Sept. 5, 1933 |
| 2,232,597 | Downey | Feb. 18, 1941 |
| 2,354,582 | Downey | July 25, 1944 |

FOREIGN PATENTS

| Number | Country | Date |
|---|---|---|
| 304,774 | Great Britain | 1929 |
| 611,167 | France | 1926 |